United States Patent
Nelson

(10) Patent No.: US 9,418,679 B2
(45) Date of Patent: Aug. 16, 2016

(54) METHODS AND APPARATUS FOR INTERPRETING RECEIVED SPEECH DATA USING SPEECH RECOGNITION

(71) Applicant: HONEYWELL INTERNATIONAL INC., Morristown, NJ (US)

(72) Inventor: Erik T. Nelson, Eden Prairie, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 17 days.

(21) Appl. No.: 14/457,809

(22) Filed: Aug. 12, 2014

(65) Prior Publication Data

US 2016/0049164 A1    Feb. 18, 2016

(51) Int. Cl.
 G10L 15/08   (2006.01)
 G10L 15/22   (2006.01)
 G10L 25/51   (2013.01)
 G10L 15/02   (2006.01)
 G10L 15/14   (2006.01)

(52) U.S. Cl.
 CPC ........... *G10L 25/51* (2013.01); *G10L 15/02* (2013.01); *G10L 15/08* (2013.01); *G10L 15/142* (2013.01); *G10L 15/22* (2013.01); *G10L 2015/025* (2013.01)

(58) Field of Classification Search
 USPC ............. 704/1, 2, 9, 237, 239, 240, 256–257
 See application file for complete search history.

(56) References Cited

U.S. PATENT DOCUMENTS

| 4,783,807 | A | * | 11/1988 | Marley | .............. G10L 25/90 704/234 |
| 5,025,471 | A | * | 6/1991 | Scott | .............. G10L 15/02 704/237 |
| 5,566,272 | A | | 10/1996 | Brems et al. | |
| 8,600,760 | B2 | | 12/2013 | Grost et al. | |
| 2004/0122666 | A1 | | 6/2004 | Ahlenius | |
| 2005/0075874 | A1 | | 4/2005 | Balchandran et al. | |
| 2008/0154600 | A1 | | 6/2008 | Tian et al. | |
| 2011/0046953 | A1 | * | 2/2011 | Arun | .............. G10L 15/187 704/255 |
| 2011/0087492 | A1 | | 4/2011 | Yoshida et al. | |
| 2014/0012578 | A1 | | 1/2014 | Morioka | |

FOREIGN PATENT DOCUMENTS

| JP | 2001242888 A | 9/2001 |
| KR | 100905438 B1 | 7/2009 |
| WO | 9710583 A1 | 3/1997 |

OTHER PUBLICATIONS

EP Extended Search Report for Application No. EP 15179589.5 Dated Dec. 22, 2015.

* cited by examiner

*Primary Examiner* — Marcellus Augustin
(74) *Attorney, Agent, or Firm* — Ingrassia, Fisher & Lorenz, P.C.

(57) ABSTRACT

A method for processing a received set of speech data, wherein the received set of speech data comprises an utterance, is provided. The method executes a process to generate a plurality of confidence scores, wherein each of the plurality of confidence scores is associated with one of a plurality of candidate utterances; determines a plurality of difference values, each of the plurality of difference values comprising a difference between two of the plurality of confidence scores; and compares the plurality of difference values to determine at least one disparity.

17 Claims, 3 Drawing Sheets

METHODS AND APPARATUS FOR INTERPRETING RECEIVED SPEECH DATA USING SPEECH RECOGNITION

TECHNICAL FIELD

Embodiments of the subject matter described herein relate generally to speech recognition systems. More particularly, embodiments of the subject matter relate to speech recognition using disparities in probabilities associated with candidate utterances.

BACKGROUND

Speech recognition systems generally use signal processing algorithms to determine the probability, based on existing language models, that a received set of speech data corresponds to a particular articulated statement. Each articulated statement consists of component parts, to include words, phonemes, and codewords, and this probability is a comparative analysis of one or more sets of these component parts. The result is a series of possible words or phrases (along with their respective probabilities) that the system believes may have been the original utterance.

Accordingly, it is desirable to provide a system for determining a most probable candidate articulated statement. Furthermore, other desirable features and characteristics will become apparent from the subsequent detailed description and the appended claims, taken in conjunction with the accompanying drawings and the foregoing technical field and background.

BRIEF SUMMARY OF EMBODIMENTS

Some embodiments provide a method for processing a received set of speech data, wherein the received set of speech data comprises an utterance. The method executes a process to generate a plurality of confidence scores, wherein each of the plurality of confidence scores is associated with one of a plurality of candidate utterances; determines a plurality of difference values, each of the plurality of difference values comprising a difference between two of the plurality of confidence scores; and compares the plurality of difference values to determine at least one disparity.

Some embodiments provide a system for processing a received set of speech data, wherein the received set of speech data comprises an utterance. The system includes a user interface module, configured to receive the set of speech data; a probability module, configured to calculate a plurality of probabilities based on the received set of speech data, each of the calculated plurality of probabilities indicating a statistical likelihood that the set of speech data comprises one of a plurality of candidate utterances; and a data analysis module, configured to: calculate a plurality of difference values, each of the plurality of difference values comprising a difference between two of the plurality of probabilities; and compare the plurality of difference values to determine at least one disparity.

Some embodiments provide a non-transitory, computer-readable medium containing instructions thereon, which, when executed by a processor, perform a method. The method receives a set of speech data; calculates a plurality of confidence scores, wherein each of the plurality of confidence scores is associated with one of a plurality of candidate utterances; determines a plurality of difference values, each of the plurality of difference values comprising a difference between two of the plurality of confidence scores; and compares the plurality of difference values to determine at least one disparity.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods and apparatus used to interpret received speech data. A statement articulated by a user conveys a set of speech data. A system executes a plurality of signal processing algorithms used for speech recognition, to calculate probabilities associated with candidate articulated statements, each probability corresponding to a statistical likelihood that a particular candidate articulate statement corresponds to the received set of speech data.

In the context of this application, the terms "speech recognition" and "voice recognition" are interchangeable. Further, the terms "speech data" and "voice data" are also interchangeable. A sample or set of speech data includes at least one word. One or more words are stored individually, in a system Dictionary. Each word comprises one or more phonemes, which may be defined as any of the perceptually distinct units of sound in a specified language that distinguish one word from another. Phonemes may include, but are not limited to, distinct units of sound associated with the English language. Phonemes provide a phonetic representation of a subset of each word, which may include a portion of the word, up to and potentially including the entire word. Each phoneme may be associated with one or more codewords, or subphonetic representations of portions of a word. Further, words may be referenced using a system Language Model, to retrieve probabilities that individual words and/or word combinations may occur in a received set of speech data.

Figure 1:
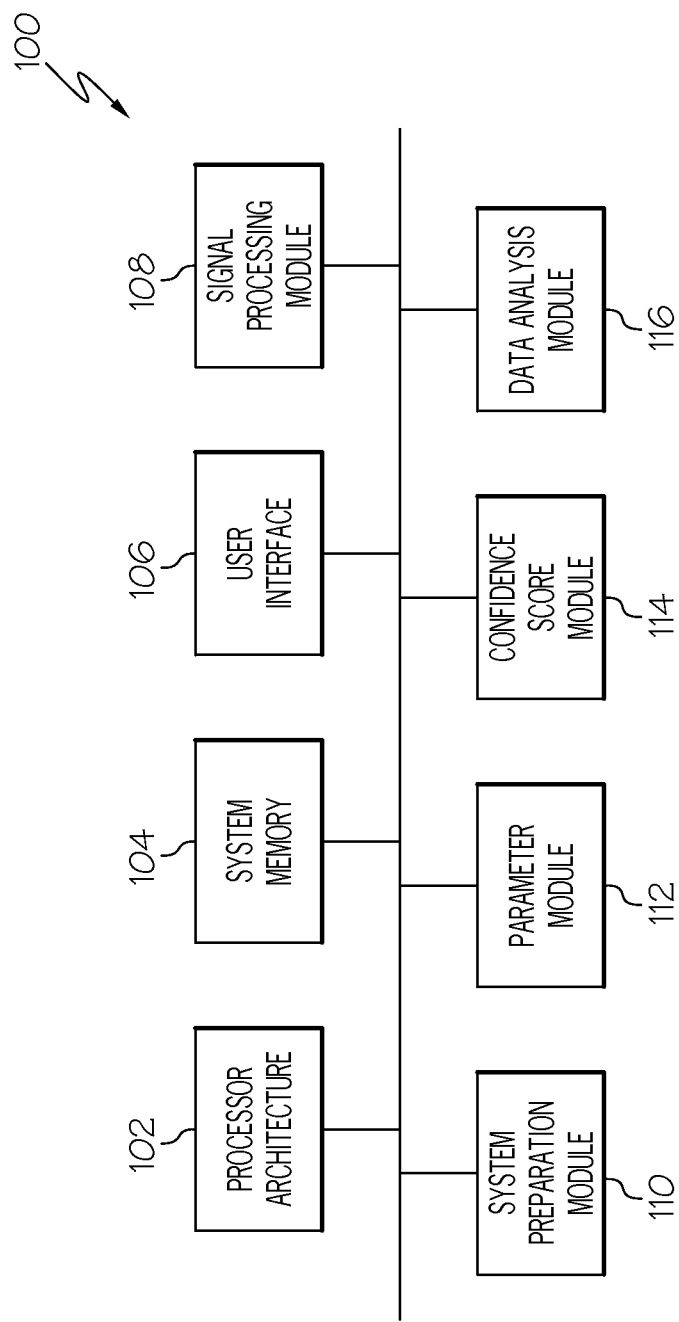
FIG. 1 is a schematic block diagram representation of a speech data recognition system, according to some embodiments.

Referring now to the drawings, FIG. 1 is a schematic block diagram representation of a speech data recognition system 100, according to some embodiments. The speech data recognition system 100 may be implemented using any desired platform. For example, the speech data recognition system 100 could be realized as any of the following, without limitation: a desktop computer, a laptop computer, a server system, a mobile device, a specialized piece of diagnostic equipment, an embedded processor-based device or system, or any other device that includes a processor architecture 102.

The speech data recognition system 100 may include, without limitation: a processor architecture 102; a system memory 104; a user interface 106; a signal processing module 108; a system preparation module 110; a parameter module 112; a confidence score module 114; and a data analysis module 116. In practice, an embodiment of the speech data recognition system 100 may include additional or alternative elements and components, as desired for the particular application. For example, additional components such as displays and user input components may be employed without departing from the scope of the present disclosure. For ease of illustration and clarity, the various physical, electrical, and logical couplings and interconnections for these elements and features are not depicted in FIG. 1. Moreover, it should be appreciated that embodiments of the speech data recognition system 100 will include other elements, modules, and features that cooperate to support the desired functionality. For simplicity, FIG. 1 only depicts certain elements that relate to the speech data recognition and completion techniques described in more detail below.

The processor architecture 102 may be implemented using any suitable processing system, such as one or more processors (e.g., multiple chips or multiple cores on a single chip), controllers, microprocessors, microcontrollers, processing cores and/or other computing resources spread across any number of distributed or integrated systems, including any number of "cloud-based" or other virtual systems.

The processor architecture 102 is in communication with system memory 104. The system memory 104 represents any non-transitory short or long term storage or other computer-readable media capable of storing programming instructions for execution on the processor architecture 102, including any sort of random access memory (RAM), read only memory (ROM), flash memory, magnetic or optical mass storage, and/or the like. It should be noted that the system memory 104 represents one suitable implementation of such computer-readable media, and alternatively or additionally, the processor architecture 102 could receive and cooperate with external computer-readable media that is realized as a portable or mobile component or application platform, e.g., a portable hard drive, a USB flash drive, an optical disc, or the like.

The user interface 106 accepts information from a user of the speech data recognition system 100, including speech data and information necessary to receive and recognize speech data. User interface 106 may include any means of transmitting user input into the speech data recognition system 100, to include without limitation: a microphone, a push-to-talk or push-to-transmit (PTT) device, a push-to-talk over cellular (PoC) device, or other input device capable of receiving audio data. The user interface 106 is also configured to present data and requests to a user. The user interface 106 may further include a computer keyboard, mouse, touch-pad, trackball, a touch-screen device; and/or other input device.

The signal processing module 108 is suitably configured to analyze received speech data to obtain a set of recognized codewords. To accomplish this, the signal processing module 108 can utilize continuous to discrete signal conversion techniques for signal processing (e.g., fast Fourier transforms (FFT), linear predictive coding (LPC), filter banks, etc.) to generate quantized feature vector representations of the received speech data. The signal processing module 108 is also configured to predefine a set number of quantization vectors, or codewords, based on this quantization process. During the quantization process, the signal processing module 108 transforms continuous signals into discrete signals (e.g., codewords).

The system preparation module 110 is configured to determine and store a probabilistic relationship between a codeword, recognized by the signal processing module 108, and one of the phonemes associated with a particular language. In certain embodiments, phonemes utilized by the speech data recognition system 100 are associated with the English language. In some embodiments, the speech data recognition system 100 utilizes phonemes associated with a non-English language. Generally, each phoneme is associated with a plurality of codewords. The system preparation module 110 determines the probabilistic relationship between a recognized codeword and a particular phoneme using a plurality of received samples of a particular phoneme.

The parameter module 112 is configured to constrain operation of the speech data recognition system 100 by limiting the interpretations of the received speech data to a set of predefined possibilities retained in system memory 104, generally referred to as a speech data recognition system 100 Dictionary. The Dictionary includes one-word entries and corresponding phonemes or codewords for each one-word entry. Each word in the Dictionary includes one or more "component" phonemes or codewords, representing each enunciated sound during articulation of the word. In some cases, a phoneme comprises one or more codewords. The parameter module 112 can: (i) communicate with the system preparation module 110 to obtain phonemes or codewords of a set of received speech data, wherein each phoneme or codeword is probabilistically related to a group of received codewords; and (ii) compare the phonemes or codewords associated with the received speech data with phonemes or codewords associated with words stored in the dictionary, and (iii) limit the candidate words, and their component phonemes or codewords, that are further evaluated by the confidence score module 114 and the data analysis module 116 (described in more detail below).

The parameter module 112 is further configured to constrain operation of the speech data recognition system 100 by limiting the interpretations of the received speech data contextually, using a Language Model, which is also retained in system memory 104. The Language Model is used to predict the probability of the next word in an utterance, given the previous word spoken. It can be used to identify the probability that a word (and its component phonemes) or a group of words (and their component phonemes) occurs in a set of speech data in a given order. The parameter module 112 may identify one or more potential words from the Dictionary (and their corresponding phonemes or codewords) that may be applicable to the received set of speech data.

The confidence score module 114 is configured to determine the probability that a particular string of phonemes (each phoneme associated with one or more codewords) corresponds to a set of received speech data. Each calculated probability is referred to as a "confidence score", and each confidence score is associated with a candidate articulated statement comprising a plurality of phonemes. The confidence score module 114 can execute signal processing algorithms, such as hidden Markov models (HMMs), to calculate the probability that a sequence of phonemes corresponds to a received set of speech data. In certain embodiments, one of the sequence of phonemes is probabilistically related to one or more recognized codewords from a set of received speech data.

The data analysis module 116 is suitably configured to calculate difference values between pairs of confidence scores, and to analyze the calculated difference values to determine whether one or more disparities exist. In certain embodiments, each difference value may represent a simple difference between two confidence scores. Here, the data analysis module 116 is configured to subtract one confidence score from another, and then to determine the absolute value of the result of this subtraction. In other words, the data analysis module 116 is configured to determine the change, or delta ($\Delta$), between two confidence scores. Each difference value is a positive value. The data analysis module 116 is further configured to evaluate the calculated difference values to determine whether one or more disparities exist. A disparity may be defined as an unusual relationship existing between difference values, such as a large gap between two difference values that may not exist between the other calculated difference values.

However, in other embodiments, the data analysis module 116 may calculate the difference values using other methods. For example, in some embodiments, each difference value may be obtained by first calculating a mean value and a standard deviation value for all of the generated confidence scores, and then subtracting the mean from a first confidence score and dividing the result by the standard deviation value. In this case, this process is repeated for each generated confidence score, to produce standardized values which may then be compared to determine whether one or more disparities exist.

In practice, the signal processing module 108, the system preparation module 110, the parameter module 112, the confidence score module 114, and the data analysis module 116 may be implemented with (or cooperate with) the processor architecture 102 to perform at least some of the functions and operations described in more detail herein. In this regard, signal processing module 108, the system preparation module 110, the parameter module 112, the confidence score module 114, and the data analysis module 116 may be realized as suitably written processing logic, application program code, or the like.

Figure 2:
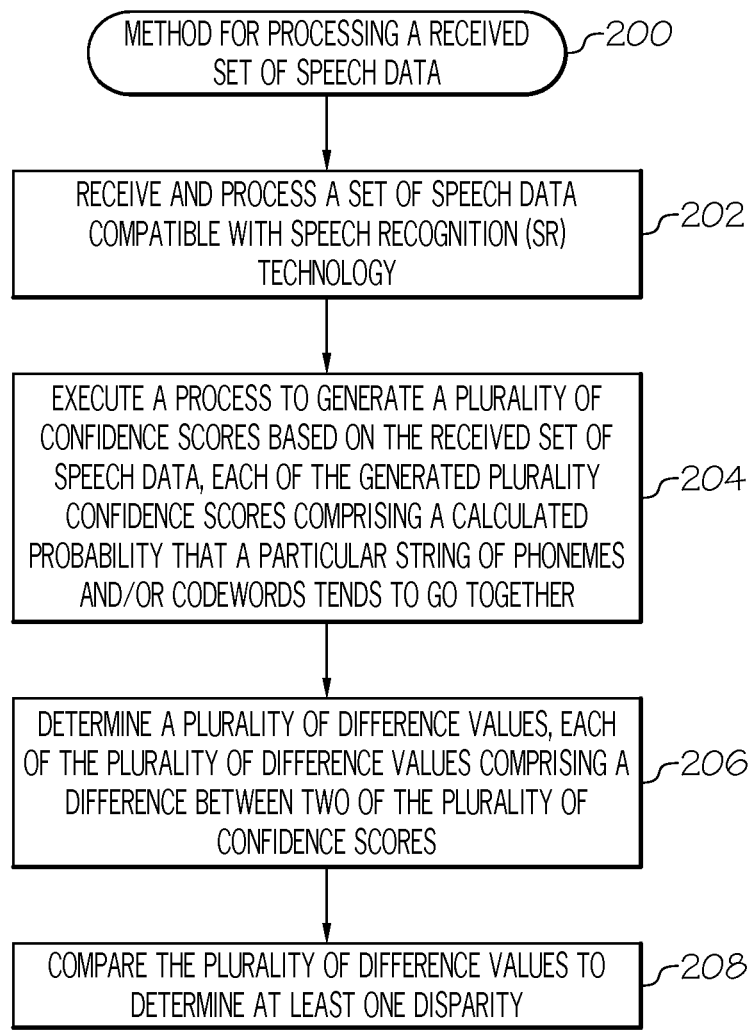
FIG. 2 is a flow chart that illustrates an embodiment of a process for processing a received set of speech data.

FIG. 2 is a flow chart that illustrates an embodiment of a process 200 for processing a received set of speech data. The various tasks performed in connection with process 200 may be performed by software, hardware, firmware, or any combination thereof. For illustrative purposes, the following description of process 200 may refer to elements mentioned above in connection with FIG. 1. In practice, portions of process 200 may be performed by different elements of the described system. It should be appreciated that process 200 may include any number of additional or alternative tasks, the tasks shown in FIG. 2 need not be performed in the illustrated order, and process 200 may be incorporated into a more comprehensive procedure or process having additional functionality not described in detail herein. Moreover, one or more of the tasks shown in FIG. 2 could be omitted from an embodiment of the process 200 as long as the intended overall functionality remains intact.

First, the process 200 receives and processes a set of speech data compatible with speech recognition (SR) technology (step 202). A received set of speech data includes at least a subset of an articulated statement (i.e., an utterance) from a user. Generally, the speech data is received via a user input or user interface device requiring the user to indicate a starting point and stopping point for speech data, as the speech data is articulated (i.e., uttered or spoken aloud) by a user. In other words, a user must indicate, via a button, switch, keyword input, or some other method, a point in time for the process 200 to begin receiving speech data. Similarly, in some embodiments, the user is required to indicate that the time for the process 200 to cease receiving the speech data. However, in some embodiments, the process 200 may interpret a prolonged period of silence as the end of a received set of speech data. The process 200 receives, and subsequently analyzes, speech data between these two indications. Once received, the process 200 analyzes and manipulates the received set of speech data, using commonly known signal processing techniques, to generate processed audio data for further use (described in more detail herein with reference to FIG. 3).

Next, the process 200 executes a process to generate a plurality of confidence scores based on the received set of speech data, each of the generated plurality of confidence scores comprising a calculated probability that a particular string of phonemes (each phoneme including one or more codewords) tend to go together (step 204). Such a string of phonemes, in total, comprises a candidate utterance, and each confidence score is associated with a candidate utterance. In certain embodiments, a plurality of processes is executed in a multi-threaded fashion, performing the analysis associated with each process simultaneously. A process may include one or more Hidden Markov Models (HMMs) corresponding to a particular candidate articulated statement, each candidate articulated statement including a plurality, or string, of phonemes. A generated probability is associated with each HMM, and is referred to as a confidence score.

Once the plurality of confidence scores have been generated (step 204), the process 200 determines a plurality of difference values, each of the plurality of difference values comprising a difference between two of the plurality of confidence scores (step 206). Generally, the process 200 produces a sequential list of probabilities, in order from the highest probability to the lowest probability. The process 200 calculates a difference value between pairs of confidence scores that are located next to one another, in sequential order. For example, for a list of confidence scores that may include confidence score A, confidence score B, confidence score C, and confidence score D, confidence score E, and confidence score F, wherein confidence score A is the highest probability and is associated with the string of phonemes that is the most likely articulated statement corresponding to a set of received speech data. Further, confidence score F is the lowest probability, and is associated with the string of phonemes that is the least likely articulated statement corresponding to the same set of received speech data. Confidence score B is the second-highest probability, confidence score C is the third-highest probability, and confidence score E is the fourth-highest probability (or the second-lowest probability). The data analysis module 116 is configured to calculate a first difference value between confidence scores A and B, a second difference value between confidence scores B and C, a third difference value between confidence scores C and D, a fourth difference value between confidence scores D and E, and a fifth difference value between confidence scores E and F.

In some embodiments, the process 200 identifies one or more confidence scores above a confidence score threshold, and determines the plurality of difference values using the identified one or more confidence scores. Here, instead of calculating difference values for all confidence scores, the process 200 constrains the system to analyzing only those confidence scores associated with at least a minimum probability of corresponding to the statement articulated by the user.

Next, the process 200 compares the plurality of difference values to determine at least one disparity (step 208). A disparity may be defined as an unusual relationship existing between difference values, such as a large gap between two difference values that may not exist between the other calculated difference values. Using the previous example, five difference values were calculated. The difference values may be: 0.5, 0.2, 0.1, 0.1, and 0.1. Here, there is a clear disparity between the first difference value and the next highest difference value, due to the numerical value of the gap between 0.5 and 0.2.

In certain embodiments, the process 200 compares a determined disparity to a predetermined disparity threshold for purposes of identifying and/or performing additional steps. The disparity threshold may include a minimum value for a disparity at which relative certainty may be associated with a candidate utterance associated with the disparity. The predetermined threshold used by the process 200 may be determined at design time, and may be relevant to a particular speech recognition application. In some embodiments, when the disparity is greater than a disparity threshold, the process 200 identifies a correct candidate utterance associated with one of the plurality of confidence scores, and completes a task associated with the correct candidate utterance. In some embodiments, when the disparity is less than the disparity threshold, the process 200 presents the user with a request to repeat the utterance comprising the set of speech data. In some embodiments, when the disparity comprises a value within a range of predetermined values, the process 200 presents a user with at least one of a plurality of candidate utterances for verification.

Figure 3:
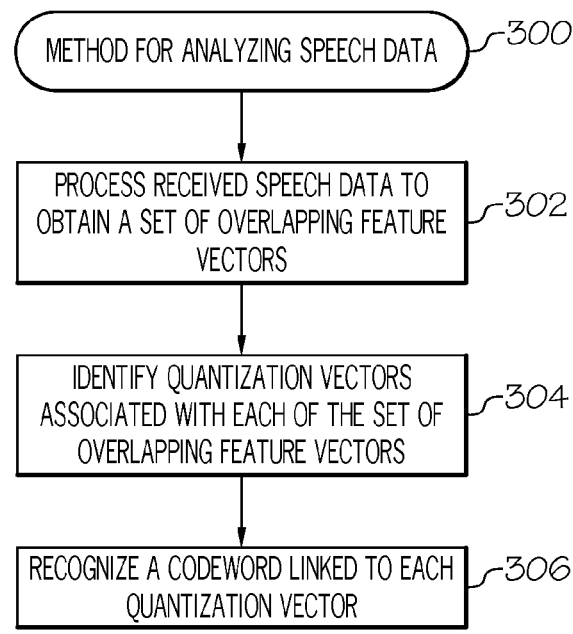
FIG. 3 is a flow chart that illustrates an embodiment of a process for analyzing received speech data.

FIG. 3 is a flow chart that illustrates an embodiment of a process 300 for analyzing received speech data. It should be appreciated that the process 300 described in FIG. 3 represents one embodiment of step 202 described above in the discussion of FIG. 2, including additional detail. First, the process 300 utilizes signal processing techniques to process received voice data to obtain a set of overlapping feature vectors (step 302). Applicable signal processing techniques may include, without limitation, analog to digital conversion, fast Fourier transforms (FFT), linear predictive coding (LPC), filter banks, and/or the like. Generated feature vectors may include FFT or LPC coefficients to represent the frequency and/or energy bands of the received voice data at various intervals of time. The time intervals may be short or long based on the computational capacity of the computer system and the desired accuracy of the speech data recognition process. The process 300 generates a feature vector for every interval of time of the received voice data. Based upon the length of the time intervals and the length of time for each feature vector, there may be an overlap between successive feature vectors.

Next, the process 300 identifies quantization vectors associated with each of the set of overlapping feature vectors (step 304). After identifying quantization vectors associated with each of the set of overlapping feature vectors (step 304), the process 300 recognizes a codeword linked to each quantization vector (step 306). Here, during the quantization process, the process 300 transforms continuous signals into discrete signals (e.g., codewords).

Figure 4:
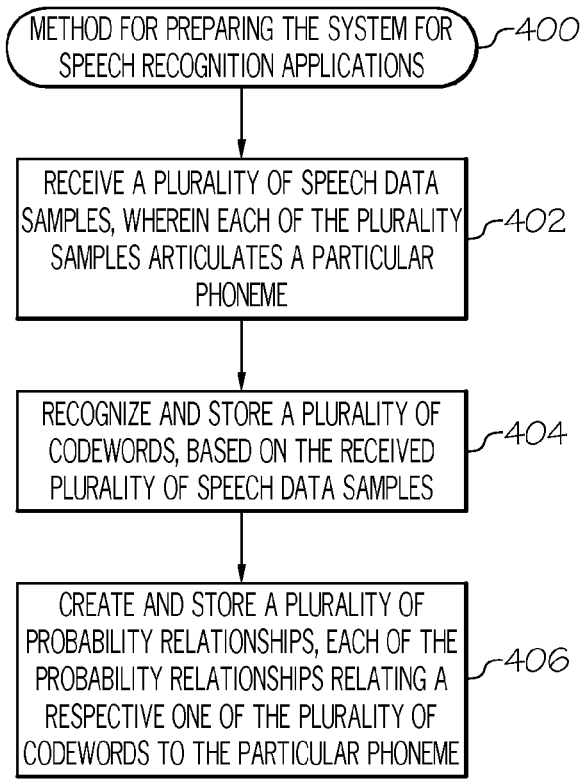
FIG. 4 is a flow chart that illustrates an embodiment of a process for preparing a speech recognition system for speech recognition applications.

FIG. 4 is a flow chart that illustrates an embodiment of a process 400 for preparing a speech recognition system for speech recognition applications. Process 400 is completed in advance of use of a speech recognition system by a user. First, the process 400 receives a plurality of speech data samples, wherein each of the plurality of speech data samples articulates a particular phoneme (step 402). In an exemplary embodiment, the process 400 receives speech samples from a variety of different sources, providing the process 400 with slightly varying articulations of a designated phoneme.

Next, the process 400 recognizes and stores a plurality of codewords, based on the received plurality of speech data samples (step 404). This process is described above with regard to FIG. 3, and will not be redundantly described here.

After recognizing and storing a plurality of codewords (step 404), the process 400 creates and stores a plurality of probability relationships, each of the probability relationships relating a respective one of the plurality of codewords to the particular phoneme (step 406). From the received plurality of speech samples, the process 400 determines a likelihood for a particular codeword to appear in a specific phoneme. These probability relationships are computed and then stored for use in speech recognition. Generally, these probability relationships are stored in a list that is populated by a list of words that are used as part of a speech command, and each word is associated with its one or more component phonemes.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for processing a received set of speech data, wherein the received set of speech data comprises an utterance, the method comprising:
receiving a set of speech data;
executing a process to calculate a plurality of probabilities based on the received set of speech data, wherein each of the plurality of probabilities indicates a statistical likelihood that the set of speech data comprises one of a plurality of candidate utterances;
determining a plurality of difference values, each of the plurality of difference values comprising a difference between two of the plurality of probabilities; and comparing the plurality of difference values to determine at least one disparity;
wherein the determining step further comprises:
calculating a first difference between a first probability and a second probability;
calculating a second difference between a third probability and a fourth probability; and
comparing the first difference to the second difference to determine the at least one disparity;
wherein the plurality of probabilities comprises the first probability, the second probability, the third probability, and the fourth probability; and
wherein the plurality of difference values comprises the first difference and the second difference.

2. The method of claim 1, further comprising:
when the disparity is greater than a disparity threshold,
identifying a correct candidate utterance associated with one of the plurality of probabilities, wherein the correct candidate utterance comprises one of the plurality of candidate utterances; and
completing a task associated with the correct candidate utterance.

3. The method of claim 1, further comprising:
when the disparity is less than a disparity threshold, present a user with a request to repeat the utterance.

4. The method of claim 1, further comprising:
when the disparity comprises a value within a range of predetermined values, present a user with at least one of the plurality of candidate utterances for verification.

5. The method of claim 1, wherein each of the plurality of probabilities comprises a calculated probability that a particular string of phonemes corresponds to the received set of speech data.

6. The method of claim 1, further comprising:
identifying one or more probabilities above a probability threshold; and determining the plurality of difference values using the identified one or more probabilities.

7. A system for processing a received set of speech data, wherein the received set of speech data comprises an utterance,
the system comprising: a user interface module, configured to receive the set of speech data;
a probability module, configured to calculate a plurality of probabilities based on the received set of speech data, each of the calculated plurality of probabilities indicating a statistical likelihood that the set of speech data comprises one of a plurality of candidate utterances; and
a data analysis module, configured to:
calculate a plurality of difference values, each of the plurality of difference values comprising a difference between two of the plurality of probabilities; and compare the plurality of difference values to determine at least one disparity;
wherein the data analysis module is further configured to:
calculate a first difference between a first probability and a second probability;
calculate a second difference between a third probability and a fourth probability; and
compare the first difference to the second difference to determine the at least one disparity:
wherein the plurality of probabilities comprises the first probability, the second probability, the third probability, and the fourth probability; and wherein the plurality of difference values comprises the first difference and the second difference.

8. The system of claim 7, wherein, when the disparity is greater than a disparity threshold, the data analysis module is further configured to:
identify a correct candidate utterance associated with one of the plurality of probabilities,
wherein the correct candidate utterance comprises one of the plurality of candidate utterances; and
complete a task associated with the correct candidate utterance.

9. The system of claim 7, wherein, when the disparity is less than a disparity threshold, the user interface module is further configured to present a user with a request to repeat the utterance.

10. The system of claim 7, wherein, when the at least one disparity comprises a value within a range of predetermined values, the user interface module is further configured to present a user with at least one of a plurality of candidate utterances for verification.

11. The system of claim 7, wherein the data analysis module is further configured to: identify one or more probabilities above a probability threshold; and determine the plurality of difference values using the identified one or more probabilities.

12. A non-transitory, computer-readable medium containing instructions thereon, which, when executed by a processor, perform a method comprising:
receiving a set of speech data, wherein an utterance comprises the set of speech data;
calculating a plurality of probabilities,
wherein each of the plurality of probabilities indicates a statistical likelihood that the set of speech data comprises one of a plurality of candidate utterances;
determining a plurality of difference values, each of the plurality of difference values comprising a difference between two of the plurality of probabilities; and comparing the plurality of difference values to determine at least one disparity;
wherein the method further comprises:
calculating a first difference between a first probability and a second probability;
calculating a second difference between a third probability and a fourth probability; and
comparing the first difference to the second difference to determine the at least one disparity:
wherein the plurality of probabilities comprises the first probability, the second probability, the third probability, and the fourth probability; and
wherein the plurality of difference values comprises the first difference and the second difference.

13. The non-transitory, computer-readable medium of claim 12, wherein the method further comprises:
when the disparity is greater than a disparity threshold,
identifying a correct candidate utterance associated with one of the plurality of probabilities, wherein the candidate utterance comprises one of the plurality of candidate utterances; and
completing a task associated with the correct candidate utterance.

14. The non-transitory, computer-readable medium of claim 12, wherein the method further comprises:
when the disparity is less than a disparity threshold, presenting a user with a request to repeat the utterance.

15. The non-transitory, computer-readable medium of claim 12, wherein the method further comprises:
when the disparity comprises a value within a range of predetermined values, presenting a user with at least one of the plurality of candidate utterances for verification.

16. The non-transitory, computer-readable medium of claim 12, wherein the method further comprises:
identifying one or more probabilities above a probability threshold; and
determining the plurality of difference values using the identified one or more probabilities.

17. The non-transitory, computer-readable medium of claim 12, wherein each of the plurality of probabilities comprises a calculated probability that a particular string of codewords corresponds to the received set of speech data.

* * * * *